US008541902B2

(12) United States Patent
Casazza et al.

(10) Patent No.: US 8,541,902 B2
(45) Date of Patent: Sep. 24, 2013

(54) WIND POWER TURBINE ELECTRIC GENERATOR COOLING SYSTEM AND METHOD AND WIND POWER TURBINE COMPRISING SUCH A COOLING SYSTEM

(75) Inventors: Matteo Casazza, Val di Vizze (IT); Georg Folie, Prati-Val di Vizze (IT)

(73) Assignee: Wilic S.AR.L., Luxembourg (LU)

(*) Notice: Subject to any disclaimer, the term of this patent is extended or adjusted under 35 U.S.C. 154(b) by 236 days.

(21) Appl. No.: 13/020,426

(22) Filed: Feb. 3, 2011

(65) Prior Publication Data
US 2012/0025533 A1 Feb. 2, 2012

(30) Foreign Application Priority Data
Feb. 4, 2010 (IT) .............................. MI2010A0170

(51) Int. Cl.
*F24H 3/00* (2006.01)
*F03D 9/00* (2006.01)

(52) U.S. Cl.
USPC ............................................................ 290/55

(58) Field of Classification Search
USPC ........................................ 415/108, 114, 117
See application file for complete search history.

(56) References Cited

U.S. PATENT DOCUMENTS

| | | | |
|---|---|---|---|
| 1,894,357 A | 1/1933 | Manikowske et al. |
| 1,948,854 A | 2/1934 | Heath |
| 1,979,813 A | 11/1934 | Reis |
| 2,006,172 A | 6/1935 | Klappauf |
| 2,040,218 A | 5/1936 | Soderberg |
| 2,177,801 A | 10/1939 | Erren |
| 2,469,734 A | 5/1949 | Ledwith |
| 2,496,897 A | 2/1950 | Strickland |
| 2,655,611 A | 10/1953 | Sherman |
| 2,739,253 A | 3/1956 | Plumb |
| 2,806,160 A | 9/1957 | Brainard |
| 2,842,214 A | 7/1958 | Prewitt |
| 2,903,610 A | 9/1959 | Bessiere |
| 3,004,782 A | 10/1961 | Meermans |
| 3,072,813 A | 1/1963 | Reijnst et al. |

(Continued)

FOREIGN PATENT DOCUMENTS

| CA | 2404939 | 4/2004 |
|---|---|---|
| CA | 2518742 | 9/2004 |

(Continued)

OTHER PUBLICATIONS

Maxime R. Dubous, Henk Polinder, Study of TFPM Machines with Toothed Rotor Applied to Direct-Drive Generators for Wind Turbines, 2004.

(Continued)

*Primary Examiner* — Tulsidas C Patel
*Assistant Examiner* — Sean Gugger
(74) *Attorney, Agent, or Firm* — Neal, Gerber & Eisenberg LLP

(57) ABSTRACT

A cooling system for cooling an electric generator of a wind power turbine including, in one embodiment:
(a) a first heat exchanger fittable to the wind power turbine to release heat, produced by the electric generator, to the outside;
(b) a second heat exchanger fittable to the rotor of the electric generator to receive heat from the rotor by thermal conduction, and which rotates about the axis of rotation of the rotor with respect to the first heat exchanger; and
(c) a closed circuit extending through the first and second heat exchanger to circulate cooling liquid.

29 Claims, 3 Drawing Sheets

(56) References Cited

U.S. PATENT DOCUMENTS

| | | | |
|---|---|---|---|
| 3,083,311 | A | 3/1963 | Krasnow |
| 3,131,942 | A | 5/1964 | Ertaud |
| 3,168,686 | A | 2/1965 | King et al. |
| 3,221,195 | A | 11/1965 | Hoffmann |
| 3,363,910 | A | 1/1968 | Toronchuk |
| 3,364,523 | A | 1/1968 | Schippers |
| 3,392,910 | A | 7/1968 | Tanzberger |
| 3,468,548 | A | 9/1969 | Webb |
| 3,700,247 | A | 10/1972 | Butler et al. |
| 3,724,861 | A | 4/1973 | Lesiecki |
| 3,746,349 | A | 7/1973 | Smale et al. |
| 3,748,089 | A | 7/1973 | Boyer et al. |
| 3,756,020 | A * | 9/1973 | Moskowitz et al. ............ 60/760 |
| 3,789,252 | A | 1/1974 | Abegg |
| 3,841,643 | A | 10/1974 | McLean |
| 3,860,843 | A | 1/1975 | Kawasaki et al. |
| 3,942,026 | A | 3/1976 | Carter |
| 3,963,247 | A | 6/1976 | Nommensen |
| 3,968,969 | A | 7/1976 | Mayer et al. |
| 4,022,479 | A | 5/1977 | Orlowski |
| 4,061,926 | A | 12/1977 | Peed |
| 4,087,698 | A | 5/1978 | Myers |
| 4,273,343 | A | 6/1981 | Visser |
| 4,289,970 | A | 9/1981 | Deibert |
| 4,291,235 | A | 9/1981 | Bergey, Jr. et al. |
| 4,292,532 | A | 9/1981 | Leroux |
| 4,336,649 | A | 6/1982 | Glaser |
| 4,339,874 | A | 7/1982 | Mc'Carty et al. |
| 4,348,604 | A | 9/1982 | Thode |
| 4,350,897 | A | 9/1982 | Benoit |
| 4,354,126 | A | 10/1982 | Yates |
| 4,368,895 | A | 1/1983 | Okamoto et al. |
| 4,398,773 | A | 8/1983 | Boden et al. |
| 4,452,046 | A | 6/1984 | Valentin |
| 4,482,831 | A | 11/1984 | Notaras et al. |
| 4,490,093 | A | 12/1984 | Chertok et al. |
| 4,517,483 | A | 5/1985 | Hucker et al. |
| 4,517,484 | A | 5/1985 | Dacier |
| 4,521,026 | A | 6/1985 | Eide |
| 4,585,950 | A | 4/1986 | Lund |
| 4,613,779 | A | 9/1986 | Meyer |
| 4,638,200 | A | 1/1987 | Le Corre et al. |
| 4,648,801 | A | 3/1987 | Wilson |
| 4,694,654 | A | 9/1987 | Kawamura |
| 4,700,096 | A | 10/1987 | Epars |
| 4,714,852 | A | 12/1987 | Kawada et al. |
| 4,720,640 | A | 1/1988 | Anderson et al. |
| 4,722,661 | A | 2/1988 | Mizuno |
| 4,724,348 | A | 2/1988 | Stokes |
| 4,761,590 | A | 8/1988 | Kaszman |
| 4,792,712 | A | 12/1988 | Stokes |
| 4,801,244 | A | 1/1989 | Stahl |
| 4,866,321 | A | 9/1989 | Blanchard et al. |
| 4,900,965 | A | 2/1990 | Fisher |
| 4,906,060 | A | 3/1990 | Claude |
| 4,973,868 | A | 11/1990 | Wust |
| 4,976,587 | A | 12/1990 | Johnston et al. |
| 5,004,944 | A | 4/1991 | Fisher |
| 5,063,318 | A | 11/1991 | Anderson |
| 5,090,711 | A | 2/1992 | Becker |
| 5,091,668 | A | 2/1992 | Cuenot et al. |
| 5,177,388 | A | 1/1993 | Hotta et al. |
| 5,191,255 | A | 3/1993 | Kloosterhouse et al. |
| 5,275,139 | A | 1/1994 | Rosenquist |
| 5,280,209 | A | 1/1994 | Leupold et al. |
| 5,281,094 | A | 1/1994 | McCarty et al. |
| 5,298,827 | A | 3/1994 | Sugiyama |
| 5,302,876 | A | 4/1994 | Iwamatsu et al. |
| 5,311,092 | A | 5/1994 | Fisher |
| 5,315,159 | A | 5/1994 | Gribnau |
| 5,331,238 | A | 7/1994 | Johnsen |
| 5,410,997 | A | 5/1995 | Rosenquist |
| 5,419,683 | A | 5/1995 | Peace |
| 5,456,579 | A | 10/1995 | Olson |
| 5,483,116 | A | 1/1996 | Kusase et al. |
| 5,506,453 | A | 4/1996 | McCombs |
| 5,579,800 | A | 12/1996 | Walker |
| 5,609,184 | A | 3/1997 | Apel et al. |
| 5,663,600 | A | 9/1997 | Baek et al. |
| 5,670,838 | A | 9/1997 | Everton |
| 5,696,419 | A | 12/1997 | Rakestraw et al. |
| 5,704,567 | A | 1/1998 | Maglieri |
| 5,746,576 | A | 5/1998 | Bayly |
| 5,777,952 | A | 7/1998 | Nishimura et al. |
| 5,783,894 | A | 7/1998 | Wither |
| 5,793,144 | A | 8/1998 | Kusase et al. |
| 5,798,632 | A | 8/1998 | Muljadi |
| 5,801,470 | A | 9/1998 | Johnson et al. |
| 5,811,908 | A | 9/1998 | Iwata et al. |
| 5,814,914 | A | 9/1998 | Caamaño |
| 5,844,333 | A | 12/1998 | Sheerin |
| 5,844,341 | A | 12/1998 | Spooner et al. |
| 5,857,762 | A | 1/1999 | Schwaller |
| 5,886,441 | A | 3/1999 | Uchida et al. |
| 5,889,346 | A | 3/1999 | Uchida et al. |
| 5,894,183 | A | 4/1999 | Borchert |
| 5,925,964 | A | 7/1999 | Kusase et al. |
| 5,952,755 | A | 9/1999 | Lubas |
| 5,961,124 | A | 10/1999 | Muller |
| 5,973,435 | A | 10/1999 | Irie et al. |
| 5,986,374 | A | 11/1999 | Kawakami |
| 5,986,378 | A | 11/1999 | Caamaño |
| 6,013,968 | A | 1/2000 | Lechner et al. |
| 6,037,692 | A | 3/2000 | Miekka et al. |
| 6,064,123 | A | 5/2000 | Gislason |
| 6,067,227 | A | 5/2000 | Katsui et al. |
| 6,089,536 | A | 7/2000 | Watanabe et al. |
| 6,093,984 | A | 7/2000 | Shiga et al. |
| 6,127,739 | A | 10/2000 | Appa |
| 6,172,429 | B1 | 1/2001 | Russell |
| 6,177,746 | B1 | 1/2001 | Tupper et al. |
| 6,193,211 | B1 | 2/2001 | Watanabe et al. |
| 6,194,799 | B1 | 2/2001 | Miekka et al. |
| 6,215,199 | B1 | 4/2001 | Lysenko et al. |
| 6,232,673 | B1 | 5/2001 | Schoo et al. |
| 6,278,197 | B1 | 8/2001 | Appa |
| 6,285,090 | B1 | 9/2001 | Brutsaert et al. |
| 6,326,711 | B1 | 12/2001 | Yamaguchi et al. |
| 6,365,994 | B1 | 4/2002 | Watanabe et al. |
| 6,373,160 | B1 | 4/2002 | Schrödl |
| 6,376,956 | B1 | 4/2002 | Hosoya |
| 6,378,839 | B2 | 4/2002 | Watanabe et al. |
| 6,384,504 | B1 | 5/2002 | Elrhart et al. |
| 6,417,578 | B1 | 7/2002 | Chapman et al. |
| 6,428,011 | B1 | 8/2002 | Oskouei |
| 6,452,287 | B1 | 9/2002 | Looker |
| 6,452,301 | B1 | 9/2002 | Van Dine et al. |
| 6,455,976 | B1 | 9/2002 | Nakano |
| 6,472,784 | B2 | 10/2002 | Miekka et al. |
| 6,474,653 | B1 | 11/2002 | Hintenlang et al. |
| 6,476,513 | B1 | 11/2002 | Gueorguiev |
| 6,483,199 | B2 | 11/2002 | Umemoto et al. |
| 6,492,743 | B1 | 12/2002 | Appa |
| 6,492,754 | B1 | 12/2002 | Weiglhofer et al. |
| 6,499,532 | B1 | 12/2002 | Williams |
| 6,504,260 | B1 | 1/2003 | Debleser |
| 6,515,390 | B1 | 2/2003 | Lopatinsky et al. |
| 6,520,737 | B1 | 2/2003 | Fischer et al. |
| 6,548,932 | B1 | 4/2003 | Weiglhofer et al. |
| 6,590,312 | B1 | 7/2003 | Seguchi et al. |
| 6,603,232 | B2 | 8/2003 | Van Dine et al. |
| 6,617,747 | B1 | 9/2003 | Petersen |
| 6,629,358 | B2 | 10/2003 | Setiabudi et al. |
| 6,664,692 | B1 | 12/2003 | Kristoffersen |
| 6,676,122 | B1 | 1/2004 | Wobben |
| 6,683,397 | B2 | 1/2004 | Gauthier et al. |
| 6,700,260 | B2 | 3/2004 | Hsu et al. |
| 6,700,288 | B2 | 3/2004 | Smith |
| 6,707,224 | B1 | 3/2004 | Petersen |
| 6,720,688 | B1 | 4/2004 | Schiller |
| 6,727,624 | B2 | 4/2004 | Morita et al. |
| 6,746,217 | B2 | 6/2004 | Kim et al. |
| 6,759,758 | B2 | 7/2004 | Martinez |
| 6,762,525 | B1 | 7/2004 | Maslov et al. |

| | | | | | | |
|---|---|---|---|---|---|---|
| 6,781,276 B1 | 8/2004 | Stiesdal et al. | | 2002/0056822 A1 | 5/2002 | Watanabe et al. |
| 6,784,564 B1 | 8/2004 | Wobben | | 2002/0063485 A1 | 5/2002 | Lee et al. |
| 6,794,781 B2 | 9/2004 | Razzell et al. | | 2002/0089251 A1 | 7/2002 | Tajima et al. |
| 6,828,710 B1 | 12/2004 | Gabrys | | 2002/0148453 A1 | 10/2002 | Watanabe et al. |
| 6,856,042 B1 | 2/2005 | Kubota | | 2003/0011266 A1 | 1/2003 | Morita et al. |
| 6,879,075 B2 | 4/2005 | Calfo et al. | | 2003/0102677 A1 | 6/2003 | Becker et al. |
| 6,888,262 B2 | 5/2005 | Blakemore | | 2003/0137149 A1 | 7/2003 | Northrup et al. |
| 6,891,299 B2 | 5/2005 | Coupart et al. | | 2003/0230899 A1 | 12/2003 | Martinez |
| 6,903,466 B1 | 6/2005 | Mercier et al. | | 2004/0066098 A1 | 4/2004 | Doherty et al. |
| 6,903,475 B2 | 6/2005 | Ortt et al. | | 2004/0086373 A1 | 5/2004 | Page, Jr. |
| 6,906,444 B2 | 6/2005 | Hattori et al. | | 2004/0094965 A1 | 5/2004 | Kirkegaard et al. |
| 6,911,741 B2 | 6/2005 | Petteersen et al. | | 2004/0119292 A1 | 6/2004 | Datta et al. |
| 6,921,243 B2 | 7/2005 | Canini et al. | | 2004/0150283 A1 | 8/2004 | Calfo et al. |
| 6,931,834 B2 | 8/2005 | Jones | | 2004/0151575 A1 | 8/2004 | Pierce et al. |
| 6,933,645 B1 | 8/2005 | Watson | | 2004/0151577 A1 | 8/2004 | Pierce et al. |
| 6,933,646 B2 | 8/2005 | Kinoshita | | 2004/0189136 A1 | 9/2004 | Kolomeitsev et al. |
| 6,942,454 B2 | 9/2005 | Ohlmann | | 2005/0002783 A1 | 1/2005 | Hiel et al. |
| 6,945,747 B1 | 9/2005 | Miller | | 2005/0002787 A1 | 1/2005 | Wobben |
| 6,949,860 B2 | 9/2005 | Hama et al. | | 2005/0082836 A1 | 4/2005 | Lagerwey |
| 6,951,443 B1 | 10/2005 | Blakemore | | 2005/0082839 A1 | 4/2005 | McCoin |
| 6,972,498 B2 | 12/2005 | Jamieson et al. | | 2005/0230979 A1 | 10/2005 | Bywaters et al. |
| 6,983,529 B2 | 1/2006 | Ortt et al. | | 2005/0280264 A1 | 12/2005 | Nagy |
| 6,984,908 B2 | 1/2006 | Rinholm et al. | | 2006/0000269 A1 | 1/2006 | LeMieux et al. |
| 6,987,342 B2 | 1/2006 | Hans | | 2006/0001269 A1 | 1/2006 | Jansen et al. |
| 6,998,729 B1 | 2/2006 | Wobben | | 2006/0006658 A1 | 1/2006 | McCoin |
| 7,004,724 B2 | 2/2006 | Pierce et al. | | 2006/0012182 A1 | 1/2006 | McCoin |
| 7,008,172 B2 | 3/2006 | Selsam | | 2006/0028025 A1 | 2/2006 | Kikuchi et al. |
| 7,008,348 B2 | 3/2006 | LaBath | | 2006/0066110 A1 | 3/2006 | Jansen et al. |
| 7,016,006 B2 | 3/2006 | Song | | 2006/0071575 A1 | 4/2006 | Jansen et al. |
| 7,021,905 B2 | 4/2006 | Torrey et al. | | 2006/0091735 A1 | 5/2006 | Song et al. |
| 7,028,386 B2 | 4/2006 | Kato et al. | | 2006/0125243 A1 | 6/2006 | Miller |
| 7,033,139 B2 | 4/2006 | Wobben | | 2006/0131985 A1 | 6/2006 | Qu et al. |
| 7,038,343 B2 | 5/2006 | Agnes et al. | | 2006/0152012 A1 | 7/2006 | Wiegel et al. |
| 7,042,109 B2 | 5/2006 | Gabrys | | 2006/0152015 A1 | 7/2006 | Bywaters et al. |
| 7,057,305 B2 | 6/2006 | Krüger-Gotzmann et al. | | 2006/0152016 A1 | 7/2006 | Bywaters et al. |
| 7,075,192 B2 | 7/2006 | Bywaters et al. | | 2007/0020109 A1 | 1/2007 | Takahashi et al. |
| 7,081,696 B2 | 7/2006 | Ritchey | | 2007/0116567 A1 | 5/2007 | Luetze |
| 7,088,024 B2 | 8/2006 | Agnes et al. | | 2007/0187954 A1 | 8/2007 | Struve et al. |
| 7,091,642 B2 | 8/2006 | Agnes et al. | | 2007/0187956 A1 | 8/2007 | Wobben |
| 7,095,128 B2 | 8/2006 | Canini et al. | | 2007/0199339 A1 * | 8/2007 | Ishihara et al. .................. 62/242 |
| 7,098,552 B2 | 8/2006 | McCoin | | 2007/0222223 A1 | 9/2007 | Bagepalli et al. |
| 7,109,600 B1 | 9/2006 | Bywaters et al. | | 2007/0222226 A1 | 9/2007 | Casazza et al. |
| 7,111,668 B2 | 9/2006 | Rürup | | 2007/0222227 A1 | 9/2007 | Casazza et al. |
| 7,116,006 B2 | 10/2006 | McCoin | | 2008/0003105 A1 | 1/2008 | Nies |
| 7,119,469 B2 | 10/2006 | Ortt et al. | | 2008/0025847 A1 | 1/2008 | Teipen |
| 7,154,191 B2 | 12/2006 | Jansen et al. | | 2008/0050234 A1 | 2/2008 | Ingersoll et al. |
| 7,161,260 B2 | 1/2007 | Krügen-Gotzmann et al. | | 2008/0107526 A1 | 5/2008 | Wobben |
| 7,166,942 B2 | 1/2007 | Yokota | | 2008/0118342 A1 | 5/2008 | Seidel et al. |
| 7,168,248 B2 | 1/2007 | Sakamoto et al. | | 2008/0197636 A1 | 8/2008 | Tilscher et al. |
| 7,168,251 B1 * | 1/2007 | Janssen .................. 60/641.1 | | 2008/0197638 A1 | 8/2008 | Wobben |
| 7,179,056 B2 | 2/2007 | Sieffriedsen | | 2008/0246224 A1 | 10/2008 | Pabst et al. |
| 7,180,204 B2 | 2/2007 | Grant et al. | | 2008/0290664 A1 | 11/2008 | Kruger |
| 7,183,665 B2 | 2/2007 | Bywaters et al. | | 2008/0303281 A1 | 12/2008 | Krueger |
| 7,196,446 B2 | 3/2007 | Hans | | 2008/0309189 A1 | 12/2008 | Pabst et al. |
| 7,205,678 B2 | 4/2007 | Casazza et al. | | 2008/0315594 A1 | 12/2008 | Casazza et al. |
| 7,217,091 B2 | 5/2007 | LeMieux | | 2009/0045628 A1 | 2/2009 | Erdman et al. |
| 7,259,472 B2 | 8/2007 | Miyake et al. | | 2009/0060748 A1 | 3/2009 | Landa et al. |
| 7,281,501 B2 | 10/2007 | Leufen et al. | | 2009/0094981 A1 | 4/2009 | Eggleston |
| 7,285,890 B2 | 10/2007 | Jones et al. | | 2009/0096309 A1 | 4/2009 | Pabst et al. |
| 7,323,792 B2 | 1/2008 | Sohn | | 2009/0302702 A1 | 12/2009 | Pabst et al. |
| 7,345,376 B2 | 3/2008 | Costin | | 2010/0019502 A1 | 1/2010 | Pabst et al. |
| 7,358,637 B2 | 4/2008 | Tapper | | 2010/0026010 A1 | 2/2010 | Pabst |
| 7,377,163 B2 | 5/2008 | Miyagawa | | 2010/0117362 A1 | 5/2010 | Vihriala et al. |
| 7,385,305 B2 | 6/2008 | Casazza et al. | | 2010/0123318 A1 | 5/2010 | Casazza et al. |
| 7,385,306 B2 | 6/2008 | Casazza et al. | | 2011/0140418 A1 * | 6/2011 | Matsuo et al. .................. 290/44 |
| 7,392,988 B2 | 7/2008 | Moldt et al. | | | | |
| 7,427,814 B2 | 9/2008 | Bagepalli et al. | | FOREIGN PATENT DOCUMENTS | | |
| 7,431,567 B1 | 10/2008 | Bevington et al. | | | | |
| 7,443,066 B2 | 10/2008 | Salamah et al. | | CN | 1554867 | 12/2004 |
| 7,458,261 B2 | 12/2008 | Miyagawa | | DE | 1130913 | 6/1962 |
| 7,482,720 B2 | 1/2009 | Gordon et al. | | DE | 2164135 | 7/1973 |
| 7,548,008 B2 | 6/2009 | Jansen et al. | | DE | 2322458 | 11/1974 |
| 7,550,863 B2 | 6/2009 | Versteegh | | DE | 2506160 | 8/1976 |
| 7,594,800 B2 | 9/2009 | Teipen | | DE | 2922885 | 12/1980 |
| 7,687,932 B2 | 3/2010 | Casazza et al. | | DE | 3638129 | 5/1988 |
| 7,944,069 B2 * | 5/2011 | Uchiyama .................. 290/44 | | DE | 3718954 | 12/1988 |
| 7,963,740 B2 * | 6/2011 | Larsen et al. .................. 415/4.3 | | DE | 3844505 | 7/1990 |
| 2002/0047418 A1 | 4/2002 | Seguchi et al. | | DE | 3903399 | 8/1990 |
| 2002/0047425 A1 | 4/2002 | Coupart et al. | | DE | 4304577 | 8/1994 |
| | | | | DE | 4402184 | 8/1995 |

| | | |
|---|---|---|
| DE | 4415570 | 11/1995 |
| DE | 4444757 | 6/1996 |
| DE | 29706980 | 7/1997 |
| DE | 19636591 | 3/1998 |
| DE | 19644355 | 4/1998 |
| DE | 19652673 | 6/1998 |
| DE | 19711869 | 9/1998 |
| DE | 19748716 | 11/1998 |
| DE | 29819391 | 2/1999 |
| DE | 19801803 | 4/1999 |
| DE | 19932394 | 1/2001 |
| DE | 19947915 | 4/2001 |
| DE | 19951594 | 5/2001 |
| DE | 10000370 | 7/2001 |
| DE | 20102029 | 8/2001 |
| DE | 10219190 | 11/2003 |
| DE | 10246690 | 4/2004 |
| DE | 102004018524 | 11/2005 |
| DE | 102004028746 | 12/2005 |
| DE | 102007042338 | 3/2009 |
| EP | 0013157 | 7/1980 |
| EP | 0232963 | 8/1987 |
| EP | 0313392 | 4/1989 |
| EP | 0627805 | 12/1994 |
| EP | 1108888 | 6/2001 |
| EP | 1167754 | 1/2002 |
| EP | 1289097 | 3/2003 |
| EP | 1291521 | 3/2003 |
| EP | 1309067 | 5/2003 |
| EP | 1363019 | 11/2003 |
| EP | 1375913 | 1/2004 |
| EP | 1394406 | 3/2004 |
| EP | 1394451 | 3/2004 |
| EP | 1589222 | 10/2005 |
| EP | 1612415 | 1/2006 |
| EP | 1641102 | 3/2006 |
| EP | 1677002 | 7/2006 |
| EP | 1772624 | 4/2007 |
| EP | 1780409 | 5/2007 |
| EP | 1829762 | 9/2007 |
| EP | 1881194 | 1/2008 |
| EP | 1921311 | 5/2008 |
| EP | 2060786 | 5/2009 |
| EP | 2136077 | 12/2009 |
| ES | 2140301 | 2/2000 |
| FR | 806292 | 12/1936 |
| FR | 859844 | 12/1940 |
| FR | 1348765 | 1/1964 |
| FR | 2401091 | 3/1979 |
| FR | 2445053 | 7/1980 |
| FR | 2519483 | 7/1983 |
| FR | 2594272 | 8/1987 |
| FR | 2760492 | 9/1998 |
| FR | 2796671 | 1/2001 |
| FR | 2798168 | 3/2001 |
| FR | 2810374 | 12/2001 |
| FR | 2882404 | 8/2006 |
| GB | 191317268 | 3/1914 |
| GB | 859176 | 1/1961 |
| GB | 1524477 | 9/1978 |
| GB | 1537729 | 1/1979 |
| GB | 2041111 | 9/1980 |
| GB | 2050525 | 1/1981 |
| GB | 2075274 | 11/1981 |
| GB | 2131630 | 6/1984 |
| GB | 2144587 | 3/1985 |
| GB | 2208243 | 3/1989 |
| GB | 2266937 | 11/1993 |
| GB | 2372783 | 9/2002 |
| JP | 57059462 | 4/1982 |
| JP | 3145945 | 6/1991 |
| JP | 5122912 | 5/1993 |
| JP | 6002970 | 1/1994 |
| JP | 6269141 | 9/1994 |
| JP | 10-070858 | 3/1998 |
| JP | 11236977 | 8/1999 |
| JP | 11-299197 | 10/1999 |
| JP | 2000-134885 | 5/2000 |
| JP | 2001-057750 | 2/2001 |
| JP | 2003453072 | 7/2003 |
| JP | 2004-153913 | 5/2004 |
| JP | 2004-297947 | 10/2004 |
| JP | 2005-006375 | 1/2005 |
| JP | 2005-020906 | 1/2005 |
| JP | 2005-312150 | 11/2005 |
| NL | 8902534 | 5/1991 |
| RU | 2000466 | 9/1993 |
| RU | 2229621 | 5/2004 |
| WO | WO8402382 | 6/1984 |
| WO | WO9105953 | 5/1991 |
| WO | WO9212343 | 7/1992 |
| WO | WO9730504 | 8/1997 |
| WO | WO9733357 | 9/1997 |
| WO | WO9840627 | 9/1998 |
| WO | WO9930031 | 6/1999 |
| WO | WO9933165 | 7/1999 |
| WO | WO9937912 | 7/1999 |
| WO | WO9939426 | 8/1999 |
| WO | WO0001056 | 1/2000 |
| WO | WO0106121 | 1/2001 |
| WO | WO0106623 | 1/2001 |
| WO | WO0107784 | 2/2001 |
| WO | WO0121956 | 3/2001 |
| WO | WO0125631 | 4/2001 |
| WO | WO0129413 | 4/2001 |
| WO | WO0134973 | 5/2001 |
| WO | WO0135517 | 5/2001 |
| WO | WO0169754 | 9/2001 |
| WO | WO0233254 | 4/2002 |
| WO | WO02057624 | 7/2002 |
| WO | WO02083523 | 10/2002 |
| WO | WO03036084 | 5/2003 |
| WO | WO03067081 | 8/2003 |
| WO | WO03076801 | 9/2003 |
| WO | WO2004017497 | 2/2004 |
| WO | WO2004042227 | 5/2004 |
| WO | WO2005103489 | 11/2005 |
| WO | WO2006013722 | 2/2006 |
| WO | WO2006032515 | 3/2006 |
| WO | WO2007063370 | 6/2007 |
| WO | WO2007110718 | 10/2007 |
| WO | WO2008052562 | 5/2008 |
| WO | WO2008078342 | 7/2008 |
| WO | WO2008086608 | 7/2008 |
| WO | WO2008098573 | 8/2008 |
| WO | WO2008102184 | 8/2008 |
| WO | WO2008116463 | 10/2008 |
| WO | WO2008131766 | 11/2008 |

OTHER PUBLICATIONS

Variable Speed Gearless Wind Turbine (website), http://www.mhi.cojp/msmw/mw/en/gearless.html, viewed on Sep. 22, 2006.
Italian Search Report dated Oct. 26, 2010 for IT MI20100170.

* cited by examiner

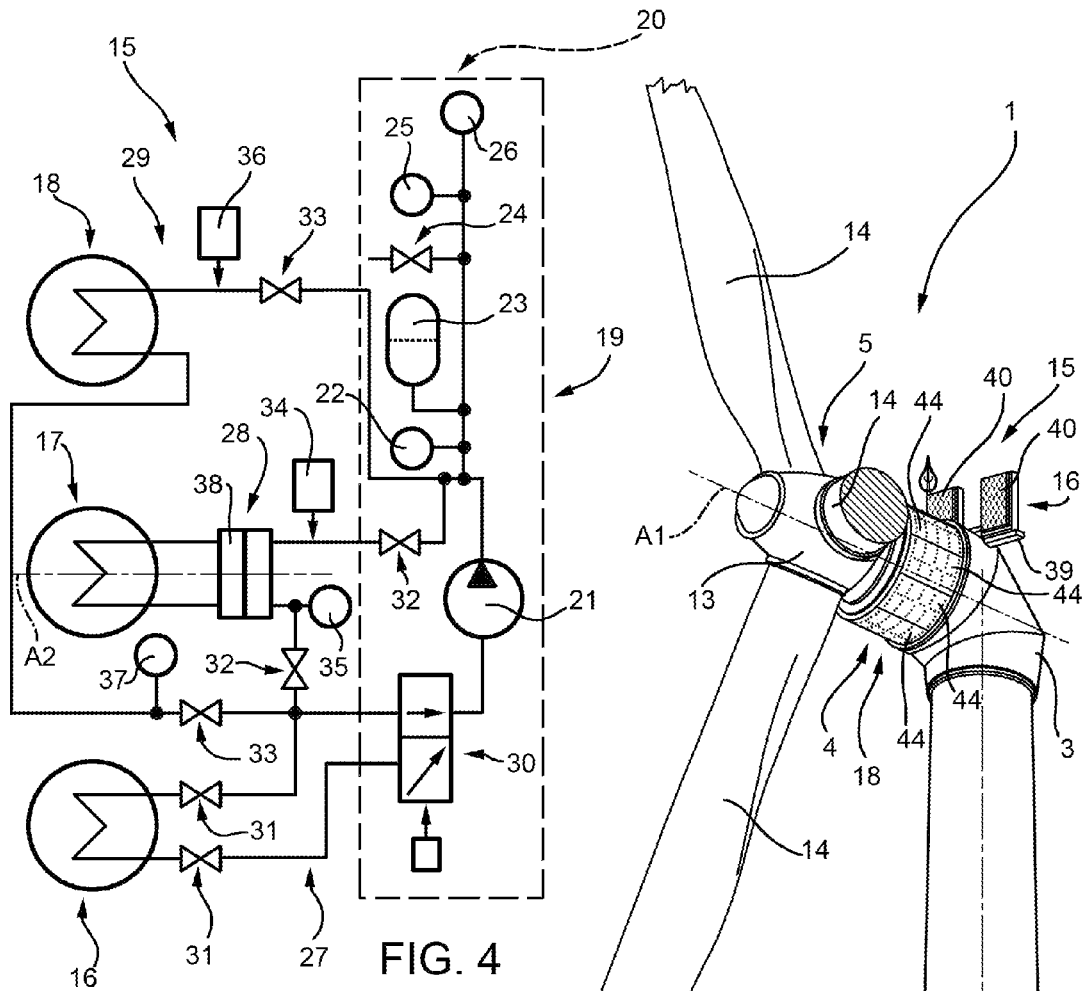
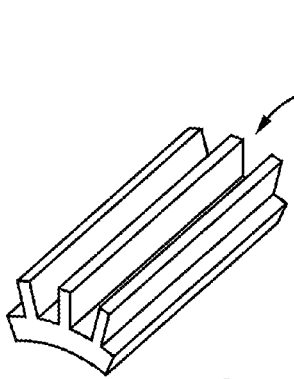
FIG. 5
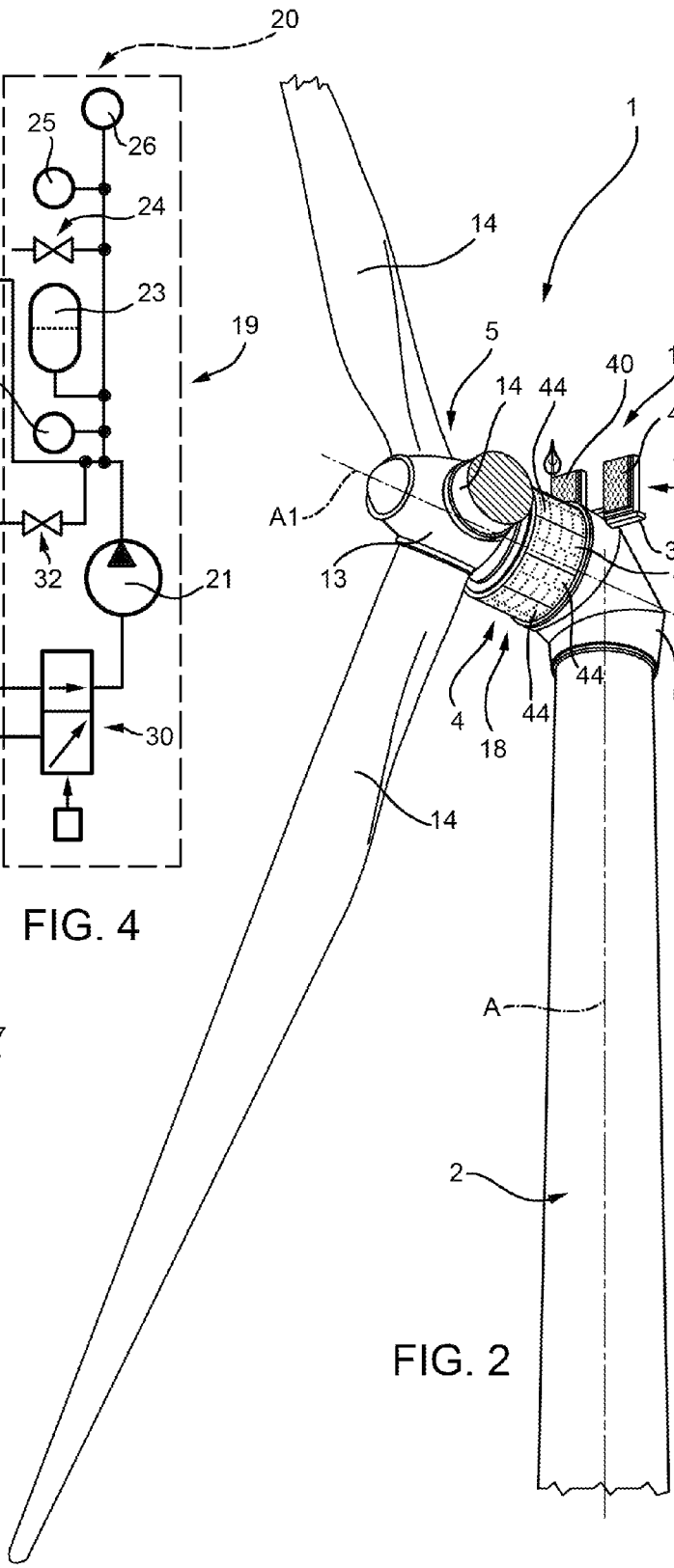
FIG. 4
FIG. 2

WIND POWER TURBINE ELECTRIC GENERATOR COOLING SYSTEM AND METHOD AND WIND POWER TURBINE COMPRISING SUCH A COOLING SYSTEM

PRIORITY CLAIM

This application claims the benefit of and priority to Italian Patent Application No. MI2010A 000170, filed on Feb. 4, 2010, the entire contents of which are incorporated herein.

BACKGROUND

Certain known wind power turbines used to produce electric energy include a blade assembly and an electric generator, which transforms part of the kinetic energy from the blade assembly into electric energy, and dissipates the rest in the form of heat, which must be disposed of for the electric generator to operate efficiently.

The electric energy produced is subsequently phase and frequency transformed in static electric machines, which are cooled to improve performance.

The wind power turbines described in U.S. Pat. No. 7,057,305, U.S. Pat. No. 7,161,260, U.S. Pat. No. 6,676,122, U.S. Pat. No. 7,594,800, and EP Patent No 2,136,077 therefore comprise respective air cooling systems. More specifically, EP Patent No. 2,136,077 describes a tubular electric generator air cooling system in which a stream of air is forced successively through the hub, the tubular electric generator, and the nacelle. In other words, air flows in through a first opening in the hub, and out through a second opening in the rear of the nacelle.

Certain known air cooling systems provide for fairly good performance of wind power turbine electric machines and generators installed in relatively mild or cold climates.

In very hot climates, however, liquid cooling systems must be used.

For example, U.S. Pat. No. 7,168,251 B1 describes a wind power turbine comprising a closed-circuit cooling system using a liquid cooling medium.

Wind power turbines must often be designed and built with cooling systems designed according to the climate of the proposed turbine installation site (i.e., capable of achieving maximum power and efficiency of the electric machines as a function of the climate in which the turbine is installed).

Designing and building wind power turbines according to the climate of the installation site seriously reduces turbine component part standardization and mass production saving.

Moreover, in connection with the above, known cooling systems are not even particularly versatile or effective in cooling the electric generator.

SUMMARY

The present disclosure relates to a wind power turbine electric generator cooling system.

More specifically, the present disclosure relates to a cooling system for an electric generator comprising a stator, and a rotor which rotates about a given axis of rotation with respect to the stator.

It is an object of the present disclosure to provide a cooling system configured to eliminate certain of the drawbacks of the known art.

Another object of the present disclosure is to provide a cooling system configured to achieve highly effective cooling of the electric generator.

According to one embodiment of the present disclosure, there is provided a cooling system for a wind power turbine electric generator, wherein the electric generator comprises a stator, and a rotor which rotates about a given first axis of rotation with respect to the stator; the cooling system comprising:

(a) a first heat exchanger fittable to the wind power turbine to release heat, produced by the electric generator, to the outside;

(b) a second heat exchanger fittable to the rotor of the electric generator to receive heat from the rotor by thermal conduction, and which rotates about the first axis of rotation with respect to the first heat exchanger; and (c) a closed circuit extending through the first and second heat exchanger to circulate cooling liquid.

The present disclosure provides for effectively cooling the electric generator rotor using the second heat exchanger, which is selectively connectable to the rotor. So, when operated in a hot climate, the wind power turbine need simply be fitted with the cooling system according to the present disclosure, with no structural alterations required to the turbine itself.

The cooling system according to the present disclosure also has the advantage of being installable on existing wind power turbines, and can therefore be marketed as a simple retrofit component.

In one embodiment of the present disclosure, the system comprises a rotary hydraulic fitting along the closed circuit to permit rotation of the second heat exchanger about a second axis of rotation with respect to the first heat exchanger.

In another embodiment of the present disclosure, the second heat exchanger comprises a number of interconnected second heat exchange modules.

The cooling system can thus be sized by simply selecting the number of second heat exchange modules according to the size of the electric generator and the operating site of the wind power turbine.

Another object of the present disclosure is to provide a wind power turbine, for producing electric energy, configured to eliminate certain of the drawbacks of the known art.

According to another embodiment of the present disclosure, there is provided a wind power turbine for producing electric energy, and comprising: a vertical support; a nacelle; a blade assembly rotating with respect to the nacelle about a first axis of rotation; an electric generator comprising a stator fitted to the nacelle, and a rotor connected to the blade assembly; and a cooling system for cooling the electric generator; the cooling system comprising:

(a) a first heat exchanger fitted to the wind power turbine to release heat, produced by the electric generator, to the outside;

(b) a second heat exchanger fitted to the rotor to receive heat from the rotor by thermal conduction, and which rotates about the first axis of rotation with respect to the first heat exchanger and the stator; and (c) a closed circuit extending through the first and second heat exchanger to circulate cooling liquid.

Another object of the present disclosure is to provide a method of cooling an electric generator, configured to eliminate certain of the drawbacks of the known art.

According to another embodiment of the present disclosure, there is provided a method of cooling an electric generator of a wind power turbine, wherein the electric generator comprises a stator, and a rotor rotating about a given first axis of rotation with respect to the stator; the method comprising the steps of:

(a) circulating cooling liquid in a closed circuit extending through at least a first heat exchanger and a second heat exchanger;

(b) transferring heat, generated by the rotor of the electric generator, by thermal conduction to the second heat exchanger fitted to the rotor and rotating about the first axis of rotation with respect to the first heat exchanger; and (c) dispersing heat, generated by the rotor, to the outside of the wind power turbine via the first heat exchanger.

Additional features and advantages are described in, and will be apparent from, the following Detailed Description and the figures.

BRIEF DESCRIPTION OF THE DRAWINGS

A non-limiting embodiment of the present disclosure will be described by way of example with reference to the accompanying drawings, in which:

FIG. 2 shows a view in perspective, with parts removed for clarity, of the FIG. 1 wind power turbine equipped with a cooling system in accordance with the present disclosure;

FIG. 4 shows a schematic of a cooling system installable on the FIG. 1 wind power turbine; and FIG. 5 shows a view in perspective, with parts removed for clarity, of a finned module which cooperates with the cooling system according to the present disclosure to cool the electric generator of the FIG. 1 wind power turbine.

DETAILED DESCRIPTION

Figure 1:
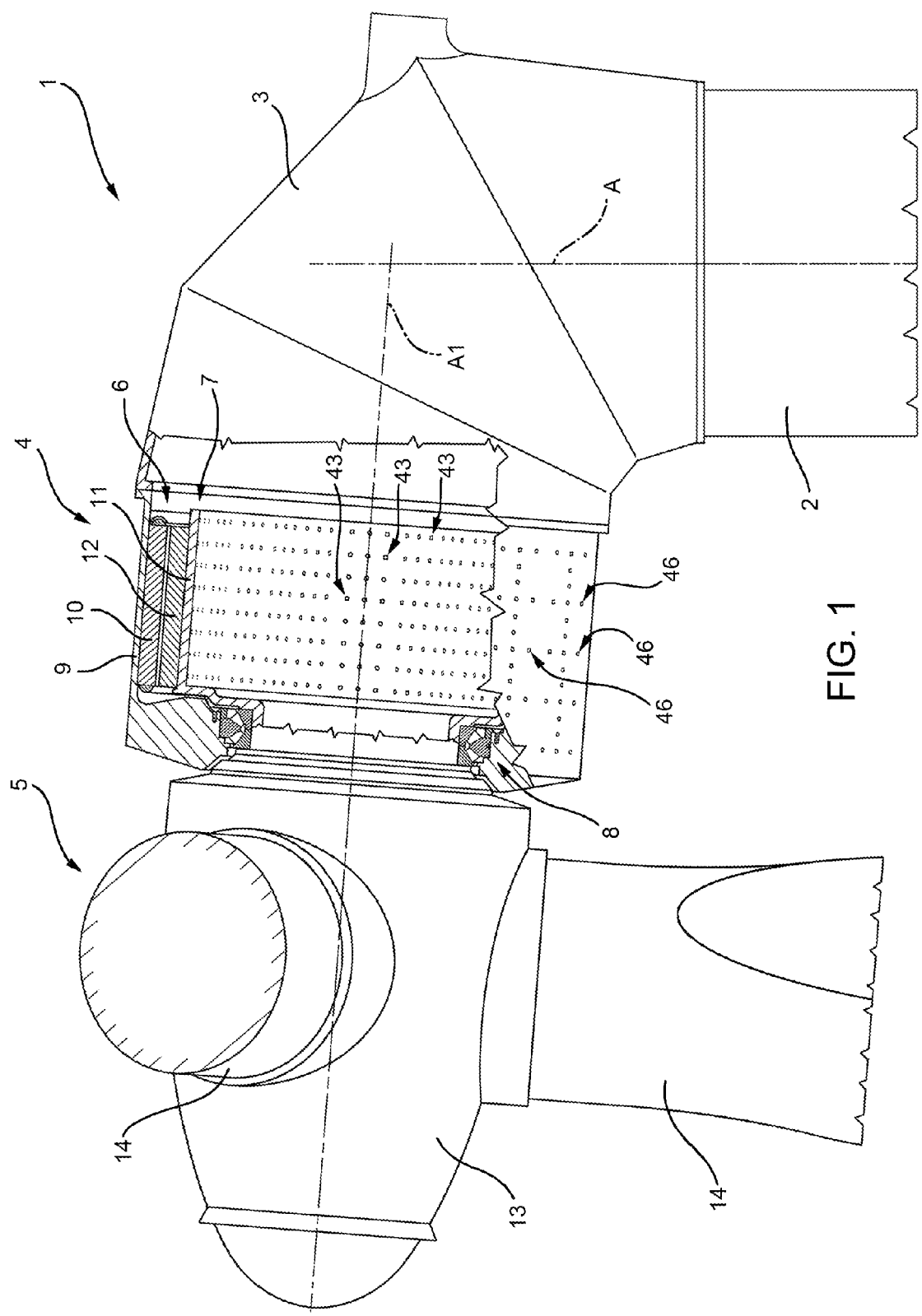
FIG. 1 shows a partly sectioned side view, with parts removed for clarity, of a wind power turbine.

Referring now to the example embodiments of the present disclosure illustrated in FIGS. 1 to 5, number 1 in FIG. 1 indicates as a whole a wind power turbine for generating electric energy, and which comprises a vertical support 2; a nacelle 3; an electric generator 4 fitted to and projecting from nacelle 3; and a blade assembly 5 for driving electric generator 4 and rotating about an axis of rotation A1.

In the FIG. 1 example, electric generator 4 is a tubular shaftless type which comprises a tubular stator 6 fitted to and projecting from nacelle 3; and a tubular rotor 7 connected to blade assembly 5 and supported by stator 6 to rotate about axis of rotation A1 with the interposition of a bearing assembly 8.

In the example shown, rotor 7 is located inside stator 6, though the present disclosure also applies to electric generators in which the rotor extends about the stator, and to electric generators with shafts.

With reference to FIG. 1, stator 6 comprises a tubular supporting structure 9—in the example shown, a cylindrical wall; and a number of stator segments 10 (only one shown in FIG. 1) fixed along the inner face of tubular supporting structure 9. In this illustrated embodiment, rotor 7 comprises a tubular supporting structure 11—in the example shown, a cylindrical wall; and a number of rotor segments 12 (only one shown in FIG. 1) fixed to the outer face of tubular supporting structure 11.

Stator segments 10 and rotor segments 12 generate respective magnetic fields, and are parallel to and equally spaced about axis of rotation A1.

Blade assembly 5 comprises a hub 13 integral with rotor 7 of electric generator 4; and three blades 14, only two of which are shown in FIG. 1.

Vertical support 2 extends along a vertical axis A, and nacelle 3 is fitted to vertical support 2 by a pivot (not shown) and is associated with an actuator (not shown) for selectively rotating nacelle 3 about axis A with respect to vertical support 2, to position blade assembly 5 into the wind.

Wind power turbine 1 described can be cooled by an open-circuit air system such as described in EP Patent No. 2,136,077, as well as by a closed-circuit liquid system, with no structural alterations to turbine 1.

Figure 3:
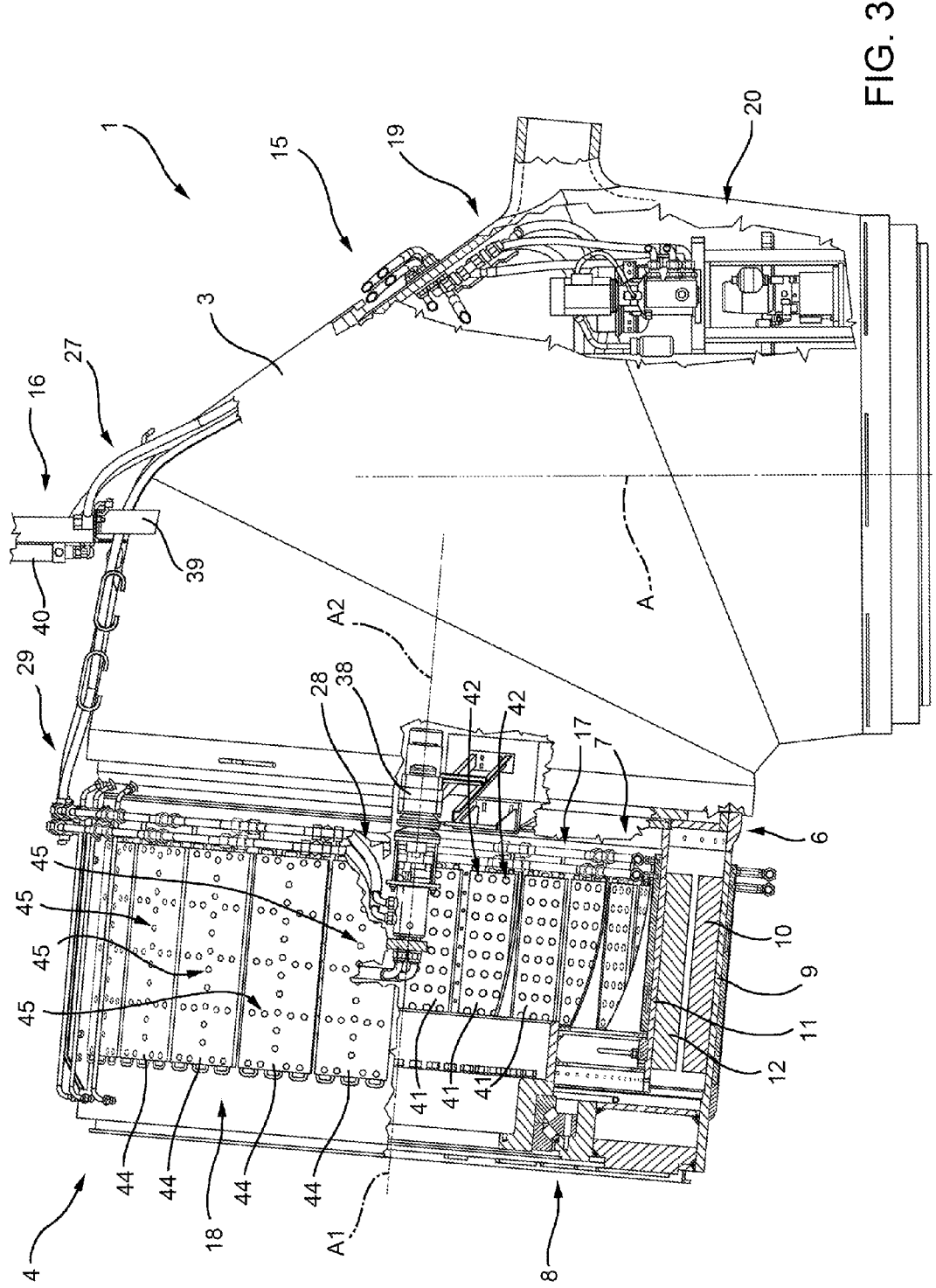
FIG. 3 shows a larger-section, partly sectioned side view, with parts removed for clarity, of a detail of FIG. 2.

In the example shown, wind power turbine 1 is connectable to a closed-circuit liquid cooling system 15 for cooling electric generator 4 as shown in FIGS. 2 and 3.

With reference to FIG. 4, cooling system 15 comprises a first heat exchanger 16 fitted to nacelle 3 (FIG. 2); a second heat exchanger 17 fitted to rotor 7 (FIG. 3); a third heat exchanger 18 fitted to stator 6 (FIG. 3); and a closed circuit 19 for directing cooling liquid along a path through first, second, and third heat exchangers 16, 17, and 18.

Cooling system 15 comprises a control station 20 associated with and for controlling cooling liquid circulation along closed circuit 19. In the example shown, control station 20 comprises a cooling liquid recirculating pump 21; a cooling liquid pressure gauge 22; an expansion vessel 23 for compensating for thermally induced variations in volume; a relief valve 24; and a pressure transducer 26 connected to a control unit (not shown) controlling pump 21.

Closed circuit 19 comprises three circuit portions 27, 28, and 29 extending through heat exchangers 16, 17, and 18 respectively.

Closed circuit 19 is configured to selectively cut off cooling liquid flow to first, second, and third heat exchangers 16, 17, and 18 without impairing performance of the circuit. In the example shown, circuit portions 27, 28, and 29 and recirculating pump 21 are arranged to cut off flow to first heat exchanger 16, and to only feed cooling liquid through circuit portion 28 and/or 29. Circuit portion 27 and relative heat exchanger 16 are excluded by a valve 30, which, in the example shown, opens and closes as a function of the liquid temperature gradient in circuit portion 27, on the one hand, and in circuit portion 28 and/or 29 on the other. Valve 30 forms part of control station 20 and controls operation of heat exchanger 16 as a function of the temperature gradient. Alternatively, valve 30 is a solenoid valve controlled by a temperature signal indicating the temperature of the cooling liquid in circuit portions 27, 28, and 29. In other words, at start-up, when the cooling liquid is cold, first heat exchanger 16 is best excluded, and only used when the cooling liquid exceeds a given threshold temperature.

Heat exchanger 16 can also be excluded by two valves 31, one upstream and one downstream from heat exchanger 16. Heat exchanger 17 is excluded by two valves 32, one upstream and one downstream from heat exchanger 17. And heat exchanger 18 is excluded by two valves 33, one upstream and one downstream from heat exchanger 18.

Circuit portion 28 comprises a flow detector 34 and a temperature sensor 35 located downstream and upstream from heat exchanger 17 respectively. And circuit portion 29 comprises a flow detector 36 and a temperature sensor 37 located downstream and upstream from heat exchanger 18 respectively.

Heat exchanger 17 is configured to rotate about an axis of rotation A2, so as to rotate together with rotor 7 (FIG. 1), so closed circuit 19 comprises a rotary hydraulic fitting 38 along circuit portion 28.

With reference to FIG. 3, rotary hydraulic fitting 38 divides closed circuit 19 into two sections: a first section substantially fixed with respect to nacelle 3; and a second section fixed with respect to rotor 7, and which rotates about axis of rotation A2 with respect to the first section. As shown in FIG. 3, constructionwise, heat exchanger 16 comprises a frame 39 connectable to wind power turbine 1; and two heat exchange modules 40 fixed to frame 39. In the FIG. 2 example, each heat exchange module is in the form of a flat panel, and is fitted to nacelle 3 by frame 39, so that rotation of nacelle 3 about axis A positions blade assembly 5 into the wind, and, at the same time, sets heat exchanger 16 to the most effective heat exchange position.

In one embodiment, heat exchange modules 40 are identical, and frame 39 is configured to support and hydraulically connect one or more panels for maximum versatility and modular design when sizing heat exchanger 16.

With reference to FIG. 3, heat exchanger 17 comprises a number of heat exchange modules 41 fixed to the inner face of tubular supporting structure 11. FIG. 3 also shows part of circuit portion 28, and rotary hydraulic fitting 38, which rotates about an axis of rotation A2, and is supported so that axis of rotation A2 is substantially coincident with axis of rotation A1. In one embodiment, heat exchange modules 41 are identical, and are selectively series or parallel connected along circuit portion 28. In the example shown, each heat exchange module 41 is in the form of a panel and configured to fit to rotor 7. More specifically, each heat exchange module 41 is in the form of a flat panel configured to adhere to the inner face of tubular supporting structure 11 and define an extensive contact area between heat exchange module 41 and tubular supporting structure 11. In the example shown, the outer face of tubular supporting structure 11 contacts rotor segments 12 (FIG. 1), and the inner face contacts heat exchange modules 41 which remove the heat produced in rotor segments 12 (FIG. 1). Heat can thus be transferred from rotor segments 12 (FIG. 1) to heat exchange modules 41 by thermal conduction.

Each heat exchange module 41 has holes 42 engaged by fastening members (not shown in the drawings). As shown in FIG. 1, tubular supporting structure 11 also has a number of holes 43 by which to fasten rotor segments 12 and heat exchange modules 41.

In another embodiment (not shown), the heat exchange modules are fixed using adhesive.

With reference to FIG. 2, heat exchanger 18 comprises a number of heat exchange modules 44 fitted along the outer face of tubular supporting structure 9 of stator 6 (FIG. 3). FIG. 3 also shows part of circuit portion 29 which connects heat exchange modules 44 in series or parallel. In the example shown, each heat exchange module 44 is in the form of a panel and is fixed to stator 6. In this illustrated example, each heat exchange module 44 is in the form of a flat plate configured to adhere to the outer face of tubular supporting structure 9 and define an extensive contact area between heat exchange module 44 and tubular supporting structure 11. In this case, the inner face of tubular supporting structure 9 contacts stator segments 10 (FIG. 1), and the outer face contacts heat exchange modules 44 which remove the heat produced in stator segments 10 (FIG. 1). Heat can thus be transferred from stator segments 10 (FIG. 1) to heat exchange modules 44 by thermal conduction.

Each heat exchange module 44 has holes 45 engaged by fastening members (not shown in the drawings). As shown in FIG. 1, tubular supporting structure 9 also has a number of holes 46 by which to fasten stator segments 10.

FIG. 3 shows electric generator 4 covered completely with heat exchange modules 44.

In another embodiment (not shown), heat exchanger 18 has fewer heat exchange modules 44 than in FIG. 3, and the resulting gaps formed along tubular supporting structure 9 can be engaged by finned modules 47 (FIG. 5), so stator 6 can be cooled by both cooling system 15, and finned modules 47 (FIG. 5) swept with air from outside wind power turbine 1.

The present disclosure has numerous advantages, which substantially comprise: the possibility of retrofitting the wind power turbine with a closed-circuit liquid cooling system; the modular design of the cooling system, which enables easy sizing of the system for different climates; highly effective cooling of the rotor, by virtue of direct contact between the heat exchanger and rotor; the versatility of the cooling system afforded by excluding at least one heat exchanger; and the possibility of operating the closed-circuit liquid cooling system and an air cooling system simultaneously.

Clearly, changes may be made to the cooling system, wind power turbine, and method as described herein without, however, departing from the scope of the accompanying Claims.

The invention is claimed as follows:

1. A wind power turbine electric generator cooling system, wherein a wind power turbine electric generator includes a stator and a rotator which rotates about a first axis of rotation with respect to the stator, the wind power turbine electric generator cooling system comprising:
 a first heat exchanger fittable to a wind power turbine to release heat produced by the wind power turbine electric generator to an area outside of the wind power turbine;
 a second heat exchanger fittable to the rotor of the wind power turbine electric generator to receive heat from the rotor of the wind power turbine electric generator by thermal conduction, said second heat exchanger configured to rotate about the first axis of rotation with respect to the first heat exchanger; and
 a closed circuit extending through the first heat exchanger and the second heat exchanger to circulate cooling liquid.

2. The wind power turbine electric generator cooling system of claim 1, which includes a rotary hydraulic fitting along the closed circuit to permit rotation of the second heat exchanger about a second axis of rotation with respect to the first heat exchanger.

3. The wind power turbine electric generator cooling system of claim 1, wherein the first heat exchanger includes:
 a frame fixable to the wind power turbine, and
 at least one first heat exchange module fitted to the frame.

4. The wind power turbine electric generator cooling system of claim 3, wherein the first heat exchanger includes a plurality of first heat exchange modules fitted to the frame.

5. The wind power turbine electric generator cooling system of claim 4, wherein the plurality of first heat exchange modules are identical.

6. The wind power turbine electric generator cooling system of claim 1, wherein the second heat exchanger includes a plurality of second heat exchange modules connected to one another.

7. The wind power turbine electric generator cooling system of claim 6, wherein the plurality of second heat exchange modules are identical.

8. The wind power turbine electric generator cooling system of claim 6, wherein each of the second heat exchange modules includes a panel, and is configured to fit to the rotor of the wind power turbine electric generator to define a contact area between the second heat exchange module and the rotor of the wind power turbine electric generator.

9. The wind power turbine electric generator cooling system of claim 1, which includes a third heat exchanger fittable to the stator of the wind power turbine electric generator.

10. The wind power turbine electric generator cooling system of claim 9, wherein the third heat exchanger includes a plurality of third heat exchange modules connected to one another.

11. The wind power turbine electric generator cooling system of claim 10, wherein the plurality of third heat exchange modules are identical.

12. The wind power turbine electric generator cooling system of claim 10, wherein each of the third heat exchange modules includes a panel, and is configured to fit to the stator of the wind power turbine electric generator to define a contact area between the third heat exchange module and the stator of the wind power turbine electric generator.

13. An electric energy producing wind power turbine comprising:
   a vertical support;
   a nacelle;
   a blade assembly configured to rotate with respect to the nacelle about a first axis of rotation;
   an electric generator including:
      a stator fitted to the nacelle, and
      a rotor connected to the blade assembly; and
   a cooling system configured to cool the electric generator, the cooling system including:
      a first heat exchanger fitted to the wind power turbine to release heat produced by the electric generator to an area outside of the wind power turbine,
      a second heat exchanger fitted to the rotor to receive heat from the rotor by thermal conduction, and configured to rotate about the first axis of rotation with respect to the first heat exchanger and the stator, and
      a closed circuit extending through the first heat exchanger and the second heat exchanger to circulate cooling liquid.

14. The electric energy producing wind power turbine of claim 13, wherein the cooling system includes a third heat exchanger fitted to the stator to receive heat from the stator by thermal conduction.

15. The electric energy producing wind power turbine of claim 13, wherein the cooling system includes a rotary hydraulic fitting along the closed circuit to permit rotation of the second heat exchanger with respect to the first exchanger about a second axis of rotation.

16. The electric energy producing wind power turbine of claim 15, wherein the second axis of rotation coincides with the first axis of rotation.

17. The electric energy producing wind power turbine of claim 13, wherein the first heat exchanger includes at least one first heat exchange module fitted to the nacelle which is configured to rotate about an axis with respect to the vertical support to position the blade assembly into the wind and simultaneously optimize efficiency of the first heat exchange module.

18. The electric energy producing wind power turbine of claim 13, wherein:
   the electric generator is tubular,
   the stator includes a first tubular supporting structure, and
   the rotor includes a second tubular supporting structure connected to the first tubular supporting structure and configured to rotate about the first axis of rotation.

19. The electric energy producing wind power turbine of claim 18, wherein the electric generator has no shaft.

20. The electric energy producing wind power turbine of claim 18, wherein the second heat exchanger includes a plurality of second heat exchange modules connected to one another and fitted to the second tubular supporting structure, each of the second heat exchange modules defining a contact area between said second heat exchange module and the second tubular supporting structure.

21. The electric energy producing wind power turbine of claim 20, wherein the rotor includes a plurality of rotor segments which generate a magnetic field and are fitted to the second tubular supporting structure, on the opposite side of the second tubular supporting structure, to the second heat exchange modules.

22. The electric energy producing wind power turbine of claim 14, wherein the third heat exchanger includes a plurality of third heat exchange modules connected to one another and fitted to a first tubular supporting structure, each of the third heat exchange modules defining a contact area between said third heat exchange module and the first tubular supporting structure.

23. The electric energy producing wind power turbine of claim 18, wherein the stator includes a plurality of stator segments which generate a magnetic field and are fitted to the first tubular supporting structure, on the opposite side of the second tubular supporting structure, to a third heat exchange module fitted to the stator to receive heat from the stator by thermal conduction.

24. A method of cooling a wind power turbine electric generator including a stator and a rotor configured to rotate about a first axis of rotation with respect to the stator, said method comprising:
   circulating cooling liquid in a closed circuit extending through at least one of: a first heat exchanger and a second heat exchanger;
   transferring heat produced by the rotor of the wind power turbine electric generator, by thermal conduction, to the second heat exchanger fitted to the rotor, wherein the second heat exchanger is configured to rotate about the first axis of rotation with respect to the first heat exchanger; and
   releasing heat produced by the rotor of the wind power turbine electric generator to an area outside of the wind power turbine by the first heat exchanger.

25. The method of cooling a wind power turbine electric generator of claim 24, which includes:
   transferring heat produced by the stator of the wind power turbine electric generator by thermal conduction to a third heat exchanger fitted to the stator, and
   releasing heat produced by the stator of the wind power turbine electric generator to the area outside of the wind power turbine by the first heat exchanger.

26. The method of cooling a wind power turbine electric generator of claim 25, wherein the closed circuit extends through the first heat exchanger, the second heat exchanger, and the third heat exchanger and which includes selectively excluding at least one of: the first heat exchanger, the second heat exchanger, and the third heat exchanger, from circulation of the cooling liquid.

27. A wind power turbine electric generator cooling system configured to operate with a wind power turbine electric generator including a stator and a rotor configured to rotate about a first axis of rotation with respect to the stator and includes a plurality of rotor segments, the wind power turbine electric generator cooling system comprising:
   a first heat exchanger configured to evacuate heat to an area outside of the wind power turbine electric generator;
   a second heat exchanger including a plurality of second heat exchanger modules, said second heat exchanger configured to evacuate heat from the rotor segments and configured to rotate about the first axis of rotation with respect to the first heat exchanger; and a closed circuit extending through the first heat exchanger and the second heat exchanger to circulate a cooling liquid.

28. An electric energy producing wind power turbine comprising:
- a vertical support;
- a nacelle;
- a blade assembly configured to rotate with respect to the nacelle about a first axis of rotation;
- an electric generator including:
  - a stator fitted to the nacelle, and
  - a rotor connected to the blade assembly; and
- a cooling system configured to cool the electric generator, the cooling system including:
  - a first heat exchanger fitted to the nacelle;
  - a second heat exchanger fitted to the rotor and configured to rotate about the first axis of rotation with respect to the first heat exchanger and the stator; and
  - a closed circuit extending through the first heat exchanger and the second heat exchanger, said closed circuit configured to circulate a cooling liquid and including a rotary hydraulic fitting along the closed circuit to permit rotation of the second heat exchanger with respect to the first exchanger about a second axis of rotation coincident with the first axis of rotation.

29. An electric energy producing wind power turbine comprising:
- a vertical support;
- a nacelle;
- a blade assembly configured to rotate with respect to the nacelle about a first axis of rotation;
- an electric generator; and
- a temperature control system including:
  - a first heat exchanger fitted to the nacelle and arranged outside the nacelle;
  - a second heat exchanger arranged inside the nacelle and configured to rotate with respect to the first heat exchanger;
  - a third heat exchanger arranged inside the nacelle;
  - a closed circuit extending through the first heat exchanger, the second heat exchanger and the third heat exchanger to circulate a cooling liquid, said closed circuit including a rotary hydraulic fitting along the closed circuit to permit rotation of the second heat exchanger with respect to the first heat changer and the third heat exchanger about a second axis of rotation coincident with the first axis of rotation.

* * * * *